United States Patent Office 3,245,968
Patented Apr. 12, 1966

3,245,968
CROSS-LINKING POLYMERS WITH A CHROMIUM COORDINATION COMPLEX OF FLUORINE OR CHLORINE SUBSTITUTED ALIPHATIC CARBOXYLIC ACID
Charles David Dipner, Cranford, N.J., assignor to Minnesota Mining and Manufacturing Company, St. Paul, Minn., a corporation of Delaware
No Drawing. Filed Dec. 20, 1961, Ser. No. 160,921
7 Claims. (Cl. 260—92.1)

This invention relates to the treatment of polymers. In one of its aspects this invention relates to the modification of physical properties of polymers by the use of metal coordination complexes. In one of its more particular aspects this invention relates to the modification of fluorine-containing olefinic polymers, and more particularly in this respect, to perfluorohaloolefin polymers.

The present application is a continuation-in-part of my prior and copending application Serial No. 556,186, filed December 29, 1955, now abandoned.

Polymer chemistry has provided a considerable number of polymeric materials ranging from liquids to thermoplastics. Thus, there are available today, a wide variety of materials which can be adapted to use in varying environments. Among the more commonly used polymeric materials are the vinyl halides such as vinyl chloride and vinylidene chloride and copolymers of these monomers with vinyl esters of aliphatic acids, e.g., vinyl acetate. Polymers in this group, because of their low cost, are rather extensively used in the preparation of tubing, insulation, etc., where environmental conditions are not particularly adverse. Where environmental conditions are severe, the fluorine-containing olefinic polymers are of particular importance. The fluorine-containing polymers are characterized by a remarkably high degree of chemical inertness and thermal stability. Thus, the fluorine-containing olefin polymers can be employed where oxidizing, reducing and solvent-type reagents are encountered. Additionally, these polymers because of their high thermal stability can be used in applications where high temperatures prevail.

Despite the wide variety of polymeric material available, it is sometimes difficult to find a polymer which satisfies all the requirements for a specific end use. It is, therefore, desirable to provide processes for modifying various characteristics of polymeric materials. A technique which increases the thermal stability and decreases the solubility of polymeric materials, is quite desirable.

It is an object of this invention to provide a means for improving the high temperature characteristics of polymers.

It is another object of this invention to provide a means for improving the solubility characteristics of polymers.

It is another object of this invention to provide a process for improving the physical properties of the fluorine-containing olefin polymers.

It is one of the more particular objects of this invention to provide a process for modifying the physical properties of the perfluorohaloolefins.

Various other objects and advantages of the present invention will become apparent to those skilled in the art on reading the accompanying description and disclosure.

In general, each of the above objects is accomplished by admixing a chromium metal coordination complex with olefin polymer. The addition of the chromium compound to the polymer apparently causes a cross-linking of the polymer chain thereby increasing thermal stability and decreasing the solubility of the polymer.

As such, the improved polymer compositions contain a small amount of irreversibly bound microscopic chromium-containing particles. In contradistinction to fillers, the chromium is dispersed in such a manner that no particles or discrete units are detectable even using the electron microscope. Regardless of the method of incorporating the chromium the chromium must become molecularly dispersed and intimately associated with the individual polymer chains in order for the reinforcing effect to manifest itself.

The polymers which may be treated and prepared in accordance with the teachings of this invention may be thermoplastic or elastomeric in nature. Certain thermoplastic polymers when treated in accordance with this invention assure the characteristics of thermoset polymers.

The new and useful polymer compositions containing a small minor amount of chromium particles represent improved products which may be utilized to greater advantage for the most part in the same applications as the unimproved products. Illustrative uses are molded articles and protective coatings, such as films. Because of the improved physical properties afforded by the incorporation of chromium, they are superior to known compositions in many of these applications. Likewise, as will become apparent, these improved properties also make possible applications for which the polymers heretofore have been unsuitable.

The chromium incorporated into the polymers in its trivalent state is preferably added in the form of a trivalent compound or a chromium complex. It is added to the polymer by intimately mixing and heating the mixture in order to irreversibly bind the chromium in the interstices of the polymer. Illustrative trivalent chromium compounds are chromic acetate, chromic sulfate, chromic chloride.

It is also possible to employ a chromium source in a valence state other than three using a procedure such that the chromium is reduced or oxidized in situ in the course of the process.

As indicated previously, this invention is applicable to the cross-linking of a polymer of a polymerizable olefin. Thus, the invention contemplates the cross-linking of polymers of ethylene, propylene, vinyl chloride, vinylidene chloride, etc. Because of their superior physical and chemical characteristics, the cross-linking reaction of this invention is of particular importance in treating polymers of polymerizable olefins containing at least one fluorine atom and is of particular importance in treating the perfluorohaloolefin polymers since these polymers are usually employed where high temperatures are anticipated. Among the perfluorohaloolefins, are found polymers of the perfluoroolefins and the perfluorochloroolefins. Representative of the perfluoroolefins are the polymers of tetrafluoroethylene, perfluoropropene, perfluorobutadiene, etc.; representative of the perfluorochloroolefins are trifluorochloroethylene-1,1 and 1,2-dichlorodifluoroethylene, 2-chloroperfluoropropene, perfluoropropene, etc. Also included within the scope of this invention are copolymers of the above described perfluorohaloolefins with each other and with other hydrogen-containing halogenated olefins, such as vinylidene fluoride, vinyl fluoride, 1,2-difluoroethylene, 1,1,1-trifluoropropene, vinyl chloride, vinylidene chloride, etc. The invention is particularly suited to the improvement of the physical properties of the polymer of trifluorochloroethylene and especially the normally solid thermoplastic homopolymer and to normally solid copolymers of trifluorochloroethylene and vinylidene fluoride containing between about 20 and less than 100 mole percent of trifluorochloroethylene. Copolymers within this range containing above about 95 mole percent of trifluorochloroethylene possess all of the desirable characteristics of the homopolymer but are superior with respect to heat embrittlement properties, and hence, are of considerable value as electrical insulations. Copolymers containing about 69 and about 80 mole percent of trifluorochloroethylene copolymerized with vinylidene fluoride are soluble in ketones, cyclic ethers, etc., and hence, are of value in lacquer formulations. Copolymers of trifluorochloroethylene containing between about 20 and about 69 mole percent of trifluorochloroethylene copolymerized with vinylidene fluoride are elastomeric and provide a valuable chemically resistant synthetic rubber. Copolymers of perfluoropropene and vinylidene fluoride, containing between about 15 and about 60 mole percent of perfluoropropene are also elastomeric and provide valuable chemically resistant synthetic rubbers.

The polymers which are treated can range from relatively low molecular weight liquids to high molecular weight normally solid materials depending on the method of polymerization. The normally solid polymers include resins and elastomers. The addition of chromium compound cross-links the polymer and in the case of the normally liquid polymers produces a gel or thickened grease which is useful in lubricating applications. The addition of chromium compound to an elastomer cures or vulcanizes the elastomer. The addition of chromium complex to a thermoplastic or resin increases its thermal stability and decreases its solubility.

Chromium coordination complexes may be prepared by reacting a chromium metal salt with a 3 to 20 carbon aliphatic carboxylic acid. Because these complexes are intended to function at elevated temperatures, those acids which have maximum thermal stability are preferred. Maximum thermal stability is attained by the use of perfluorohalo carboxylic acids in the preparation of the chromium complexes. In preparing a complex the chromium in the form of a salt is reacted with the acid. Suitable chromium salts are the acetates, nitrates, chlorides, oxychlorides, etc. The preparation of chromium complexes is illustrated in detail in the examples given hereinbelow.

Blending of the metal coordination complex with the polymer can be achieved in any manner which insures homogeneity. Thus, the polymer complex can be blended in a ball mill, pebble mill, or in other suitable blending equipment. The amount of chromium coordination complex employed will vary to a large extent depending upon the desired degree of cross-linking but will generally range between about 0.1 and about 20 weight percent based on the weight of polymer and preferably between 0.5 and 5 percent.

Curing or cross-linking of the treated polymer is effected by maintaining the polymer at a temperature above about 225° C. and preferably above about 250° C. for a period of time above about 1 hour. The heating period can be continued indefinitely although 15 days is a practical maximum. Preferably, the heating period is between about 1 and about 48 hours.

The following examples are presented in order to illustrate the invention. In the examples, the term "ZST" is used. This term refers to an empirical test for determining the physical characteristics of polymeric materials and is a reflection of the molecular weight of the polymer involved, i.e., the higher the ZST, the higher the molecular weight. In the case of compositions containing the chromium compounds of this invention, the increase in the ZST is due to the cross-linking action. The ZST test is described in "Modern Plastics," October 1954, page 146.

EXAMPLE I

Steel panels which had been blasted with BB No. 25 grit were coated with a chrome complex of

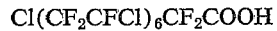

by immersion in a 5 weight percent solution of the complex in acetone. One panel was dip coated twice and the other was dip coated four times. The panels were baked 5 minutes at 150° C. after each dip. The complex coated panels were then coated with a dispersion of a homopolymer of trifluorochloroethylene in xylene-diisobutyl ketone (80/20) dispersant and were baked for one-half hour at about 250° C. (480° F.). There was no fusion of the polymer particles. The panels were baked again for one hour with no evidence of fusion. The homopolymer coating stripped easily from the complex treated panel. After an additional four hours of baking at about 250° C. there was still no fusion. The melt viscosity of the applied homopolymer had increased, indicating a cross-linking reaction. When the previously described dispersion was applied to a grit-blasted but untreated steel panel, fusion of the particles occurred after baking for one-half hour at about 250° C.

EXAMPLE II

A blend of 5 percent by weight of the chromium complex of $Cl(CF_2CFCl)_8CF_2COOH$ was prepared by mixing in a mortar and pestle. A molded sheet was prepared from this material by pressing at 2500 p.s.i. for 3 minutes at 260° C. The ZST of this pressing was the same as that of the original of the homopolymer, i.e., about 710 seconds. The pressed sheet was bluish-purple in color. A piece of this sheet was heated at 250° C. for 7 days. The resulting green material has a ZST in excess of 5000 seconds.

EXAMPLE III

A blend of about 1 percent of the chromium complex of $Cl(CF_2CFCl)_8CF_2COOH$ and a homopolymer of trifluorochloroethylene was prepared by ball milling for 2 hours. This blend was pressed for 3 minutes at 260° C. and 2500° p.s.i. These pressings were slightly colored and had essentially the same ZST as the starting material, i.e., about 710 seconds. No marked increase in ZST was observed after heating at 190° C. for 16 hours. However, heating at 250° C. for 12 hours gave a material with a ZST in excess of 5000 seconds. It should be noted, that these sheets were cured at 250° C. by suspending them in a 250° C. oven for the 12 hour period. Dimensionally similar sheets which did not contain chromium complex did not support their own weight at 250° C.

EXAMPLE IV

A composition containing 80 parts of a copolymer of trifluorochloroethylene and vinylidene fluoride (98.6/1.4 mole ratio), 19 parts of a homopolymer of trifluorochloroethylene and 1 part of the chromium complex of

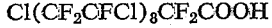

was prepared by ball milling for 2 hours. This composition was pressed as described in Example I to yield a material having a ZST of 990 seconds. A pressed sheet was cured for 15 hours at 250° C. in an oven. Although the resulting pale green sheet could be repressed in the usual manner, it had a ZST in excess of 11,000 seconds.

EXAMPLE V

This example illustrates the use of metal coordination complex with a liquid polymer. Approximately 54 g. of a homotelomer of trifluorochloroethylene having the general formula $Cl(CF_2CFCl)_nCl$ and boiling between 130 and 170° C. at 0.5 mm. was admixed with 6 g. of the chromium complex of $Cl(CF_2CFCl)_6CF_2COOH$ and heated to 200° C. until bubbling stopped (due to water in either the oil or the complex). The mixture was then heated to 250° C. for 15 minutes after which it was cooled to room temperature. The oil was gelled or thickened.

EXAMPLE VI

Approximately 1 weight percent of a chromium complex of $Cl(CF_2CFCl)_2CF_2COOH$ is ball milled with a copolymer of trifluorochloroethylene and vinylidene fluoride (approximately 75/25 mole ratio) for two hours. The blend is pressed into a sheet which is bluish in color. The sheet is then cured by heating at 250° C. for 12 hours. A cross-linked polymer having a green color is obtained.

EXAMPLE VII

Approximately 1 weight percent of a chromium complex of $Cl(CF_2CFCl)_2CF_2COOH$ is ball milled with a copolymer of trifluorochloroethylene and vinylidene fluoride (approximately 50/50 mole ratio) for two hours. The blend is pressed into a sheet which is a bluish color. The sheet is then cured by heating at 250° C. for 12 hours. A cross-linked polymer having a green color is obtained.

EXAMPLE VIII

Approximately 1 weight percent of a chromium complex of $Cl(CF_2CFCl)_{10}CF_2COOH$ is ball milled with a normally solid homopolymer of trifluorochloroethylene for two hours. The blend is pressed into a sheet by pressing at 2500 p.s.i. for 3 minutes at 260° C. The pressed sheet is bluish in color and has a ZST of the original homopolymer. The sheet is cured by heating at 250° C. for 10 hours. The cured sheet is green in color and has a ZST more than double the original ZST.

EXAMPLE IX

Substantially equivalent results are obtained by blending in a ball mill approximately 1 weight percent respectfully of the beryllium, magnesium, scandium, titanium, zirconium, vanadium, molybdenum, tungsten and manganese complex of $Cl(CF_2CFCl)CF_2COOH$ with a homopolymer of trifluorochloroethylene.

EXAMPLE X

Approximately 1 weight percent of a chromium complex of $F(CF_2CF_2)CF_2COOH$ is ball milled with a homopolymer of trifluorochloroethylene for about 1 hour. The blend is pressed into a sheet by pressing at 2500 p.s.i. for 3 minutes at 260° C. The sheet is then cured by heating at 250° C. for 12 hours. A cross-linked polymer having a green color is obtained.

EXAMPLE XI

Approximately 1 weight percent of a chromium complex of $F(CF_2CF_2)_2CF_2COOH$ is ball milled with a homopolymer of trifluorochloroethylene for about 1 hour. The blend is pressed into a sheet by pressing at 2500 p.s.i. for 3 minutes at 260° C. The sheet is then cured by heating at 250° C. for 12 hours. A cross-linked polymer having a green color is obtained.

EXAMPLE XII

Approximately 1 weight percent of a chromium complex of $Cl(CF_2CFCl)CF_2COOH$ is ball milled with a homopolymer of vinyl chloride for about 1 hour. The blend is pressed into a sheet by pressing at about 2500 p.s.i. for 3 minutes at 170° C. The sheet is then cured by heating at 225° C. for 10 hours. A cross-linked polymer having a green color is obtained.

EXAMPLE XIII

Approximately 1 weight percent of a chromium complex of $Cl(CF_2CFCl)CF_2COOH$ is ball milled with a homopolymer of vinylidene chloride for about 1 hour. The blend is pressed into a sheet by pressing at about 2500 p.s.i. for 3 minutes at 170° C. The sheet is then cured by heating at 225° C. for 10 hours. A green colored cross-linked polymer is obtained.

EXAMPLE XIV

Approximately 1 weight percent of a chromium complex of $Cl(CF_2CFCl)CF_2COOH$ is ball milled with a homopolymer of tetrafluoroethylene for about 1 hour. The blend is pressed into a sheet by pressing at about 2500 p.s.i. for 3 minutes at 270° C. The sheet is then cured by heating at 250° C. for 10 hours. A green colored cross-linked polymer is obtained.

EXAMPLE XV

Approximately 1 weight percent of a chromium complex of $Cl(CF_2CFCl)CF_2COOH$ is ball milled with an elastomeric copolymer of hexafluoropropene and vinylidene fluoride (30/70 mol ratio) for about 1 hour. The blend is pressed into a sheet by pressing at about 2500 p.s.i. for 3 minutes at 270° C. The sheet is then cured by heating at 250° C. for 10 hours. The polymer is crosslinked.

From the foregoing examples it is evident that halogen-containing polymers are cross-linked by the process of this invention. However, the cross-linked mechanism is not clearly understood although it is believed to occur through the metal constituent of the complex. The following examples are intended to show that ordinary metal salts do not function as cross-linking agents.

EXAMPLE XVI

Approximately 1 g. of chromic acetate $$Cr(OOCCH_3)_3 \cdot H_2O$$

and 99 gms. of a homopolymer of trifluorochloroethylene (ZST about 710) were ball milled for 2 hours and dried for 40 hours at 100° C. The sample was pressed at 260° C. for 3 minutes. The pressing was opaque and colored a blue-green. The pressed sample was "cured" at 250° C. for 19 hours. The sample was bubbled but there was no evidence of cross-linking.

EXAMPLE XVII

Approximately 1 g. of chromic hydroxide $Cr(OH)_3$ and 99 gms. of a homopolymer of trifluorochloroethylene (ZST about 710) were ball milled for 2 hours. The sample was pressed at 260° C. but was badly bubbled.

This invention resides in the use of metal coordination complexes in cross-linking halogenated olefin polymers and not in the preparation of the complex itself. However, for purposes of clarity, the preparation of the metal complex is described hereinbelow. As indicated, a wide variety of metal complexes can be employed. Those which have particular utility because of their superior cross-linking characteristics, economy, and ease, of preparation, are those complexes prepared from beryllium, titanium, vanadium, chromium and tungsten salts. Chromium complexes are particularly suitable. With regard to the acids, the preferred halogenated aliphatic carboxylic acids are the perfluorohalo aliphatic carboxylic acids because of their thermal stability. Within this group of acids the perfluorochloroalkane carboxylic acids are preferred, since complexes prepared from these acids are compatible (to the extent required by this invention) with a wider variety of polymers.

Many of the halogenated carboxylic acids are already known. For example, the preparation of perfluoro aliphatic carboxylic acids is described in U.S. Patent 2,567,011. Chlorinated carboxylic acids are listed in the literature. However, for purposes of clarity, a method of preparing a wide variety of halogenated carboxylic acids is described herein. This method of preparation involves the telomerization of a halogen-containing olefin using a sulfuryl halide as the telogen. Representative of the halogenated olefins, are tetrafluoroethylene, trifluorochloroethylene symmetrical and unsymmetrical dichlorodifluoroethylene, trichlorofluoroethylene, vinyl chloride and vinylidene chloride. The telomerization reaction produces compounds having the general formula $X(Y)_nX$ in which X is chlorine or fluorine depending upon whether sulfuryl chloride or fluoride is employed and Y is an olefin (e.g., those previously mentioned) containing at least one normally gaseous halogen and $n$ is an integer from 2 to 20. The telomerization reaction is described in detail in the copending application Serial No. 294,495, filed June 19, 1952, by W. S. Barnhart. Compounds produced by the telomerization reaction are hydrolyzed to the corresponding carboxylic acid by treating with sulfuric acid containing sulfur trioxide at an elevated temperature.

EXAMPLE XVIII

As a specific example illustrating the preparation of the fluorohalocarbon telomer products which are used in preparing the halogenated acids, 9.93 grams of benzoyl peroxide and 24 grams of sulfur dioxide are dissolved in 115 ml. of carbon tetrachloride and 325 ml. of sulfuryl chloride. To this mixture, 440 ml. of trifluorochloroethylene monomer are added and the system is heated to about 95° C. for a period of 4 hours at a pressure of 350 pounds per square inch gage with agitation to produce a high yield of relatively low molecular weight telomers. The telomeric product is relatively easy to separate into its individual compounds by distillation since it contains only compounds having an even number of carbon atoms so that each compound has a boiling point relatively far removed from that of the next lower or next higher compound. The formula of these telomer products of trifluorochloroethylene and sulfuryl chloride is the following:

$$Cl(CF_2CFCl)_nCl$$

wherein $n$ is an integer between about 2 and about 20. The physical characteristics of some of the individual telomer products and of the mixtures of such products which are used in preparing the olefin starting materials, are given in the following Table I and Table II, respectively.

Table I

PHYSICAL PROPERTIES OF INDIVIDUAL TRIFLUOROCHLOROETHYLENE SULFURYL CHLORIDE TELOMER PRODUCTS.

| Individual Telomer Products | Boiling Point, °C. | Index of Refraction ($nD^{20}$) |
|---|---|---|
| (1) Cl—(CF$_2$—CFCl)$_2$—Cl | 134 | 1.3820 |
| (2) Cl—(CF$_2$—CFCl)$_3$—Cl | 203 | 1.3956 |
| (3) Cl—(CF$_2$—CFCl)$_4$—Cl | 255 | 1.4018 |
| (4) Cl—(CF$_2$—CFCl)$_5$—Cl | 300 | 1.4024 |
| (5) Cl—(CF$_2$—CFCl)$_6$—Cl | 335 | 1.4110 |

Table II

PHYSICAL PROPERTIES OF MIXTURES OF TRIFLUOROCHLOROETHYLENE-SULFURYL CHLORIDE TELOMER PRODUCTS

| Telomer Oil Fraction | Boiling Range, °C. at 0.5 mm. | Approximate Molecular Weight | Density | | Viscosity | | Melting Point, °F. |
|---|---|---|---|---|---|---|---|
| | | | 100° F. | 210° F. | 68° F. | 130° F. | |
| 1 | 20–95 | 460 | 1.823 | 1.720 | 4.0 | | |
| 2 | 95–132 | 570 | 1.862 | 1.768 | 12.3 | 3.7 | |
| 3 | 132–170 | 680 | 1.910 | 1.823 | 108 | 14.4 | |
| 4 | 170–207 | 800 | 1.940 | 1.853 | a 2.07 | b 8.9 | |
| 5 | 207–245 | 1,000 | 1.962 | 1.873 | a 1,578 | b 27.2 | 88 |
| 6 | 245 | 1,600 | | | | b 371.6 | 175 | a At 100° F.
b At 210° F.

The telomers described above, are hydrolyzed to the corresponding carboxylic acids by treatment with concentrated sulfuric acid containing sulfur trioxide at elevated temperatures. By proper control of the temperature, duration of treatment and concentration of the fuming sulfuric acid, monoacids are produced.

Formation of the monoacids of the telomers described above, and particularly telomers having the formula Cl—(CF$_2$—CFCl)$_n$—Cl, is accomplished by hydrolyzing the telomer with concentrated sulfuric acid containing from substantially 0 to 70 percent excess SO$_3$ at a temperature ranging from about 140° C. to about 300° C. for a period ranging from about 5 to about 50 hours. In general, the low concentration of fuming sulfuric acid (containing about 0 to about 20 percent SO$_3$), lower temperatures (between about 140 and about 210° C.) and shorter reaction times (5 to 25 hours) are sufficient to hydrolyze the CFCl$_2$ group to COOH, the diacid being formed in lower yield if at all, under such conditions.

The following examples illustrate the preparation of metal coordination complexes.

EXAMPLE XIX.—CHROMYL CHLORIDE COMPLEX OF Cl(CF$_2$—CFCl)$_3$CF$_2$COOH

Chromyl chloride (0.1 mole) dissolved in 50 ml. of dichloromethane was added drop-wise to a solution of ethanol (0.055 mole) and Cl(CF$_2$—CFCl)$_3$CF$_2$COOH (0.05 mole) in 100 ml. of dichloromethane. Heat was evolved during the addition, and the solution was refluxed for a period of one hour. The solution was evaporated leaving 35 grams of a deep red solid complex.

EXAMPLE XX.—CHROMYL CHLORIDE COMPLEX OF Cl(CF$_2$—CFCl)$_3$CF$_2$COOH

To a stirred, refluxing solution of

(0.028 mole), isopropyl alcohol (0.054 mole) and carbon tetrachloride (125 ml.) was added drop-wise a solution of chromyl chloride (0.058 mole) in carbon tetrachloride (45 ml.). Additional isopropyl alcohol (0.033 mole) was needed to reduce all the chromyl chloride to the Cr$^{+++}$ form (green). The resulting mixture was refluxed for one hour, cooled, and concentrated under reduced pressure. The residue (26.9 grams) was dissolved in dry isopropyl alcohol (108 grams) and filtered.

EXAMPLE XXI.—CHROMIC NITRATE COMPLEX OF Cl(CF$_2$—CFCl)$_3$CF$_2$COOH

A solution (pH 5) of Cl(CF$_2$—CFCl)$_3$CF$_2$COOH (0.03 mole) in water (100 ml.) was diluted with a solution of Cr(NO$_3$)$_3$·9H$_2$O (0.06 mole) in water (25 ml.). The resulting mixture was heated to boiling and allowed to cool. The aqueous layer was separated by decantation. The lower organic layer was dried (24 grams), dissolved in isopropyl alcohol (96 grams) and filtered.

EXAMPLE XXII.—CHROMIC ACETATE COMPLEX OF Cl(CF$_2$—CFCl)$_3$CF$_2$COOH

A solution (pH 5) of Cl(CF$_2$—CFCl)$_3$CF$_2$COOH (0.03 mole) in water (100 ml.) was diluted with a solution of Cr(OAc)$_3$·H$_2$O (0.06 mole) in water (40 ml.). The resulting mixture was heated to boiling, whereupon a blue-gray solid precipitated. After being allowed to cool, the solid was filtered, dried (19.5 grams) and dissolved in isopropyl alcohol. The alcohol solution was filtered.

EXAMPLE XXIII.—CHROME COMPLEX OF Cl(CF$_2$CFCl)CF$_2$COOH

A two liter flask with a drain stopcock at the bottom was equipped with a stirrer, thermometer, reflux condenser and dropping funnel. It was charged with chromic acetate [Cr(OAc)$_3$·H$_2$O] (31.3 g.) and water (125 ml.) and heated to 60° C., then there was added $$Cl(CF_2CFCl)_1CF_2COOH$$

(62 g.) in methanol (45 ml.) over a ten minute period. The reaction temperature was raised to 8–85° C. and maintained for fifteen minutes before allowing the mixture to cool to room temperature. After settling overnight, two phases were evident. The bottom layer was separated and dried to yield 72.4 gms. of complex.

EXAMPLE XXIV.—CHROME COMPLEX OF $Cl(CF_2CFCl)_4CF_2COOH$

Chromic acetate $Cr(OAc)_3$ (6.0 g.) was dissolved in 50 percent aqueous methanol (120 ml.) at 50° C. with stirring. To this hot solution was added slowly $$Cl(CF_2CFCl)_4CF_2COOH$$

(30 g.) in methanol (30 ml.). The reaction was heated for a half hour at 70–75° C., then it was allowed to cool to room temperature. The lower phase which had formed was recovered in a separatory funnel. The remaining aqueous layer was heated to 75° C. and on cooling two phases again were evident.

EXAMPLE XXV

Using the process of the preceding examples, chromium complexes of the perfluorinated carboxylic acids having the formula $C_nF_{2n+1}COOH$ in which $n$ is equivalent to 2 to 19, are prepared. Typical of these perfluorinated carboxylic acid complexes, are the chromium complexes of $C_3F_7COOH$, $C_5F_{11}COOH$, and $C_7F_{15}COOH$.

EXAMPLE XXVI

Chromium complexes of $Cl(CH_2CHCl)_nCH_2COOH$ in which $n$ equals from 1 to 18 are prepared according to the preceding examples. The acid referred to above, is prepared by telomerizing vinyl chloride with sulfuryl chloride and by hydrolyzing the resulting product with sulfuric acid.

EXAMPLE XXVII

A beryllium complex of the perfluorochloro aliphatic carboxylic acids is prepared as follows; beryllium basic carbonate (10 g.) was reacted with $$Cl(CF_2CFCl)_6CF_2COOH$$

(180 g.). The reaction was extracted and crystallized from a chloroform hexane mixture (4 to 1) to yield 84 grams of a white powder (M.P. 70–80° C.).

EXAMPLE XXVIII

Metal complexes of magnesium, the Groups IIIB, IVB, VB, VIB and VIIB, are prepared by the previously described reactions.

The utility of a technique which increases the thermal stability of polymeric materials is believed obvious. However, a representative example of utility is presented below.

EXAMPLE XXIX

An untreated homopolymer of trifluorochloroethylene (ZST about 710) is extruded over a length of silver plated copper wire. The wire is overloaded so that its temperature reaches about 275° C. The untreated polymer insulation flows from the wire. Under similar conditions, a polymer of trifluorochloroethylene (ZST about 710) containing about 1 weight percent of the chrome complex of $Cl(CF_2CFCl)CF_2COOH$ and cured by heating at 250° C. for 10 hours does not flow when the wire is overloaded.

EXAMPLE XXX

A 100 gallon horizontal stainless steel reactor was cooled to 25° F. The reactor was then charged with 72 gallons of distilled water having a pH of from 4 to 7 and containing no appreciable oxidizables. Agitation was started and the distilled water adjusted to a 90° F. Dibasic sodium phosphate heptahydrate (12 lbs.) and potassium persulfate (6 lbs.) were dissolved in the distilled water and 3,5,7,8-tetrachloroundecafluorocaprylic acid (3 lbs.) was then added with continued agitation. At this stage the pH of the solution was 7.5.

A monomer blend containing trifluorochloroethylene (97 mol percent) and vinylidene fluoride was charged into the reactor at a reactor pressure of 200 p.s.i.g. The rate of monomer consumption was adjusted to 50 lbs. per hour until 215 lbs. of the monomer had been consumed.

The latex was diluted with an equal volume of water and the pH of the diluted latex adjusted to 4–5 with 5% sulfuric acid accompanied by vigorous agitation to avoid local coagulation. A solution of 1% by weight of $Cr_2(SO_4)_3 \cdot H_2O$ equal to one-half the volume of the diluted latex was added slowly with continued stirring. The mixture was then heated to 80° C. during which time the latex coagulated and the mixture was stirred for 3 hours while maintained at this elevated temperature. The coagulum was separated on a centrifuge and washed once with water and three times with methanol. Upon removal from the centrifuge, the polymer was dried for 24 hours at 175° C. and was green.

The resulting polymer contained microscopic chromium-containing particles (0.2% by weight chromium) that could not be washed out after repeated washing and thus contained irreversibly bound chromium and had a ZST (zero strength time) of 1000 seconds at 250° C. This polymer is useful as a wire coating, for spark-plug caps, and in other applications requiring a polymer having a high ZST value.

The same polymer containing no chromium normally has a ZST value of 200 seconds at 250° C.

EXAMPLE XXXI

A 100 gallon horizontal stainless steel reactor was cooled to 25° F. The reactor was then charged with 72 gallons of distilled water having a pH of from 4 to 7 and containing no appreciable oxidizables. Agitation was started and the distilled water adjusted to a 90° F. Dibasic sodium phosphate heptahydrate (12 lbs.) and potassium persulfate (6 lbs.) were added to and dissolved in the distilled water and 3,5,7,8-tetrachloroundecafluorocaprylic acid (3 lbs.) was then added with continued agitation. At this stage the pH of the solution was about 7.5.

A monomer blend containing trifluorochloroethylene (97 mol percent) and vinylidene fluoride was charged into the reactor at a reactor pressure of 200 p.s.i.g. The rate of monomer consumption was adjusted to 50 lbs. per hour until 215 lbs. of the monomer had been consumed.

To the resulting latex was added $\frac{1}{20}$ of its volume of a freshly prepared solution of $Cr_2(CH_3CO_2)_6 \cdot 2H_2O$. The mixture was heated to 80° C. and stirred for 30 minutes at 80° C. The resulting latex was completely frozen and then thawed. Agitation was resumed as soon as the impellers were free and continued until a slurry was discharged to a centrifuge. After the filter cake had developed in the centrifuge, it was washed with distilled water (6 lbs. per pound of coagulum) and then with methanol (4 lbs. per pound of coagulum).

The wet polymer cake after being dried to a methanol content of about 23 weight percent was charged to a stainless steel rotating vacuum dryer and dried at 230° F. under vacuum for 6 hours. The drier and polymer were then cooled over a two hour period with cold water.

The resulting polymer of trifluorochloroethylene was in the form of white granules having the physical appearance of granulated sugar, and contained irreversibly bound, microscopic particles of chromium, and had a ZST value at 250° C. of over 1000 seconds. The polymer is useful in the same applications as the polymer prepared in Example XXX.

EXAMPLE XXXII

Three samples of a polytetrafluoroethylene latex were treated with chromic sulfate, chromic acetate and basic-chromic sulfate. The stress relaxation properties of these treated polymers were compared with an untreated sample which contained no chromium.

The latex samples (100 cc. were mixed with 10 cc. of a 0.1 M solution of $CR_2(SO_4)_3 \cdot 5H_2O$; 5 cc. of a 0.1

M solution of $Cr_2(CH_3CO_2)_6 \cdot 2H_2O$; and 25 cc. of 0.1 M $Cr_2(SO_4)_3 \cdot 5H_2O$ and 0.2 M potassium hydroxide. The first two samples were heated to 80° C. and stirred for 30 minutes at 80° C. The third sample coagulated immediately The uncoagulated treated lattices were coagulated by freezing. In each instance the stress relaxation properties of the polymers containing microscopic chromium-containing particles were substantially better than the untreated control sample as determined on an Instron universal tester.

EXAMPLE XXXIII

A freshly prepared aqueous solution of chromic acetate was added to a latex of an elastomeric copolymer of vinylidene fluoride and perfluoropropene and boiled. The pH of the latex prior to boiling was adjusted to a value of 2 with 10% HCl and the latex coagulated upon boiling. The coagulum was thoroughly washed so that all unbound chromium was removed.

The samples which are elastomeric, were tested by determining their tensile strength at 200% elongation as compared to a control sample which contained no microscopically irreversible bound chromium particles. The results of these tests were as follows:

| Sample No. | Percent Cr | Tensile Strength (p.s.i.) |
|---|---|---|
| 1 | 0 | 111 |
| 2 | 0.8 | 164.5 |
| 3 | 0.6 | 145 |
| 4 | 0.9 | 209 |

It was also found that the elastomers were rendered insoluble in methyl-ethyl ketone and compatible with glycerine and other polar molecules which function as plasticizers.

EXAMPLE XXXIV

A latex of polytrifluorochloroethylene (100 cc.) containing about 20% by weight solids and prepared as shown in Example XXXI was added to a 20% hydrochloric acid solution (3 cc.) with agitation to thicken the latex. A freshly prepared 1% by weight solution of $Cr_2(CH_3CO_2)_6$ (5 cc.) was added to the thickened latex and the mixture was boiled to coagulate the polymer. The resulting polymer had a ZST value of greater than 3000.

I claim:
1. A composition of matter comprising a linear polymer of an ethylenically unsaturated olefin or a halogen substituted olefin containing a chromium coordination complex of a fluorine or chlorine substituted aliphatic carboxylic acid uniformly dispersed and intermingled throughout the polymer.

2. A composition of matter comprising a linear polymer of an ethylenically unsaturated halogen substituted olefin containing between about 0.1 and about 20 weight percent based on the weight of polymer of a chromium coordination complex of a fluorine or chlorine substituted aliphatic carboxylic acid uniformly dispersed and intermingled throughout the polymer.

3. A composition of matter comprising a linear polymer of an ethylenically unsaturated perfluorohaloolefin containing between about 0.1 and about 20 weight percent based on the weight of polymer of a chromium coordination complex of a perfluorohalo aliphatic carboxylic acid uniformly dispersed and intermingled throughout the polymer.

4. A composition of matter comprising a linear thermoplastic homopolymer of trifluorochloroethylene containing between about 0.1 and about 20 weight percent based on the weight of polymer of a chromium coordination complex of $Cl(CF_2CFCl)CF_2COOH$ uniformly dispersed and intermingled throughout the polymer.

5. A composition of matter comprising a linear polymer of an ethylenically unsaturated fluorine or chlorine substituted olefin crosslinked with between about 0.1 and about 20 weight percent based on the weight of polymer of a chromium coordination complex of a fluorine or chlorine substituted aliphatic carboxylic acid uniformly dispersed and intermingled throughout the polmer.

6. A process which comprises uniformly dispersing and intermingling throughout a linear polymer of an ethylenically unsaturated fluorine substituted olefin a chromium coordination complex of a fluorine substituted aliphatic carboxylic acid and maintaining said resulting admixture at a temperature above 225° C. for a period of time between one hour and 15 days.

7. A process which comprises uniformly dispersing and intermingling throughout a linear polymer of trifluorochloroethylene between about 0.1 and about 20 weight percent of a chromium coordination complex of an acid having the formula $Cl(CF_2CFCl)_nCF_2COOH$ in which $n$ is an integer from 1 to 18 and maintaining said resulting admixture at a temperature above about 225° C. for a period of time between one hour and 15 days.

References Cited by the Examiner
UNITED STATES PATENTS

| 2,662,835 | 12/1953 | Reid | 117—121 |
| 2,693,458 | 11/1954 | Olson | 260—2 |
| 2,737,505 | 3/1956 | Finholt | 260—45.75 |

OTHER REFERENCES

Schildknecht: "Vinyl and Related Polymers," page 479, Wiley (1957).

JOSEPH L. SCHOFER, *Primary Examiner.*

LOUISE P. QUAST, *Examiner.*

J.F. McNALLY, *Assistant Examiner.*